F. BEEMER.
GEAR CHANGING MECHANISM FOR AUTOMOBILES.
APPLICATION FILED NOV. 11, 1908.

930,029.

Patented Aug. 3, 1909.

3 SHEETS—SHEET 1.

WITNESSES:
Rob'R Kitchel
Frank E Finch

INVENTOR
Frank Beemer
BY
Augustus B Stoughton
ATTORNEY

F. BEEMER.
GEAR CHANGING MECHANISM FOR AUTOMOBILES.
APPLICATION FILED NOV. 11, 1908.
930,029.
Patented Aug. 3, 1909.
3 SHEETS—SHEET 2.
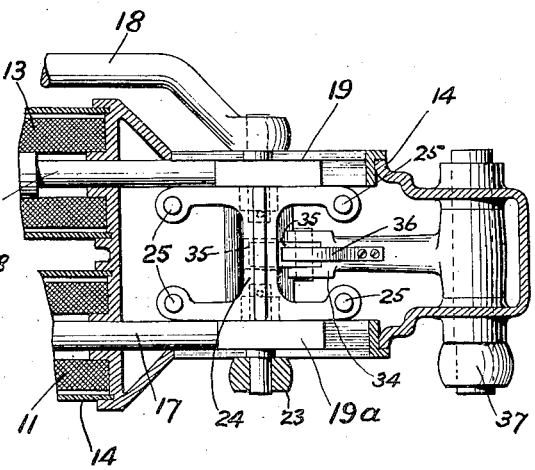
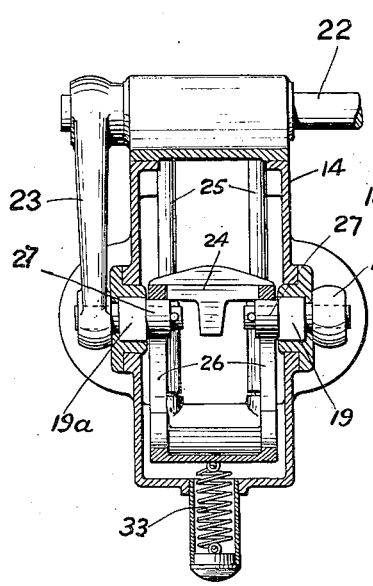
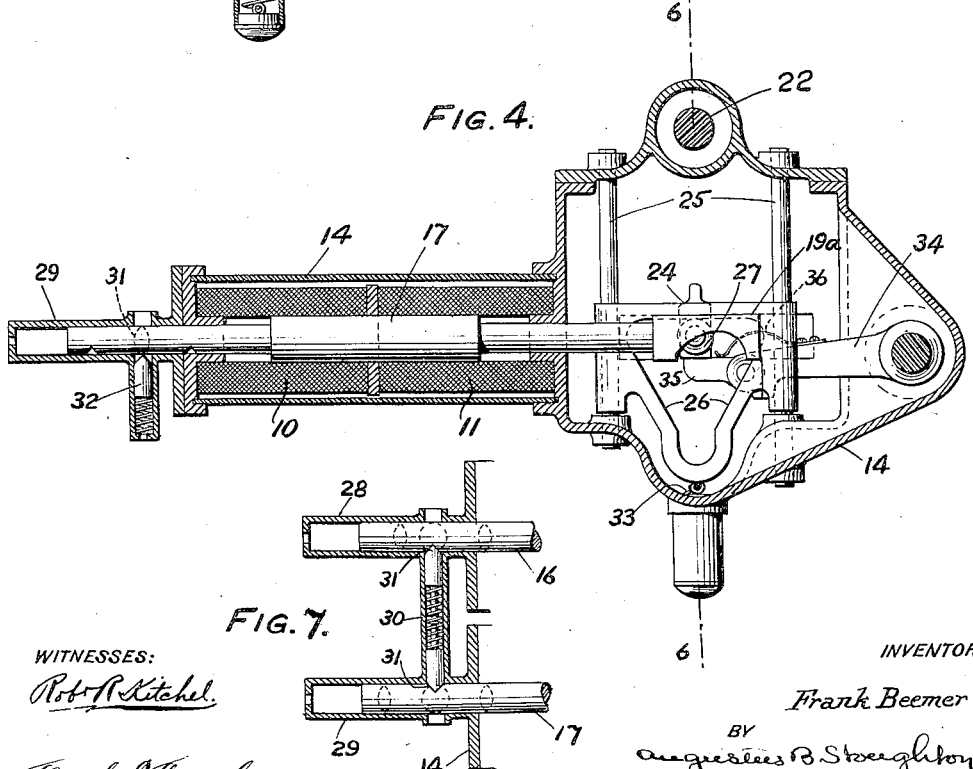
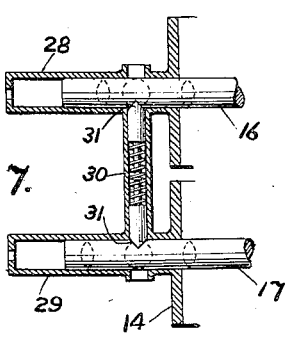
WITNESSES:
Rob't R Kitchel.
Frank E French.
INVENTOR
Frank Beemer
BY
Augustus B Stoughton
ATTORNEY.

UNITED STATES PATENT OFFICE.

FRANK BEEMER, OF PHILADELPHIA, PENNSYLVANIA, ASSIGNOR TO SAMUEL S. EVELAND, OF PHILADELPHIA, PENNSYLVANIA.

GEAR-CHANGING MECHANISM FOR AUTOMOBILES.

No. 930,029.  Specification of Letters Patent.  Patented Aug. 3, 1909.

Application filed November 11, 1908. Serial No. 462,015.

*To all whom it may concern:*

Be it known that I, FRANK BEEMER, a citizen of the United States, residing at the city of Philadelphia, in the county of Philadelphia and State of Pennsylvania, have invented certain new and useful Gear-Changing Mechanism for Automobiles, of which the following is a specification.

Objects of the present invention are to provide for shifting or changing the gears of an automobile in such a way that the only thing required of the operator is the manipulation of the clutch and of push buttons or simple handles which may be conveniently grouped at the steering head or wheel and in such a way that it is impossible for the operator to do any harm even though he push the buttons in a way or order not intended or desired; to provide where electrical mechanism is employed for the prevention of arcing or sparking at the push buttons by limiting the current to be broken at such points; to provide efficient mechanical means for returning the gears to neutral position, and, in brief, to provide a simple efficient and reliable control for the change gears of an automobile which can be conveniently operated from the steering head or wheel even by an unskilled operator quickly and in an advantageous manner.

The invention will be claimed at the end hereof and a description of it will first be given in connection with the embodiment of it chosen for illustration in the accompanying drawings in which—

Figure 2:
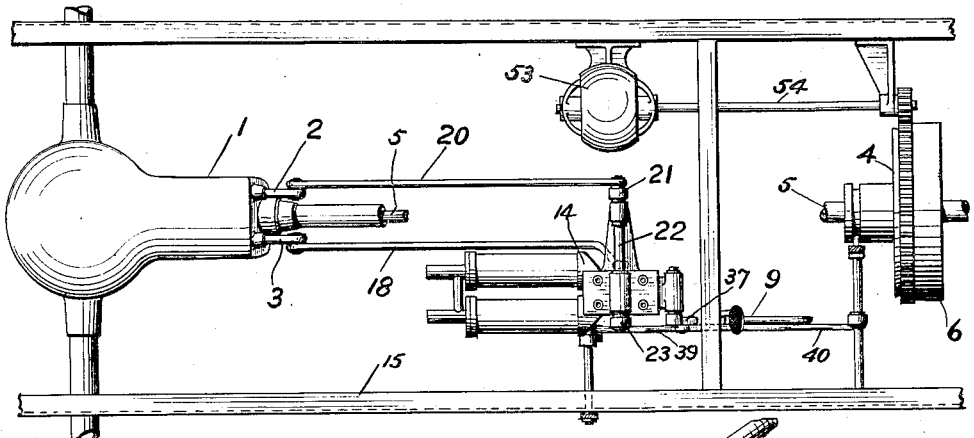
Figure 1:
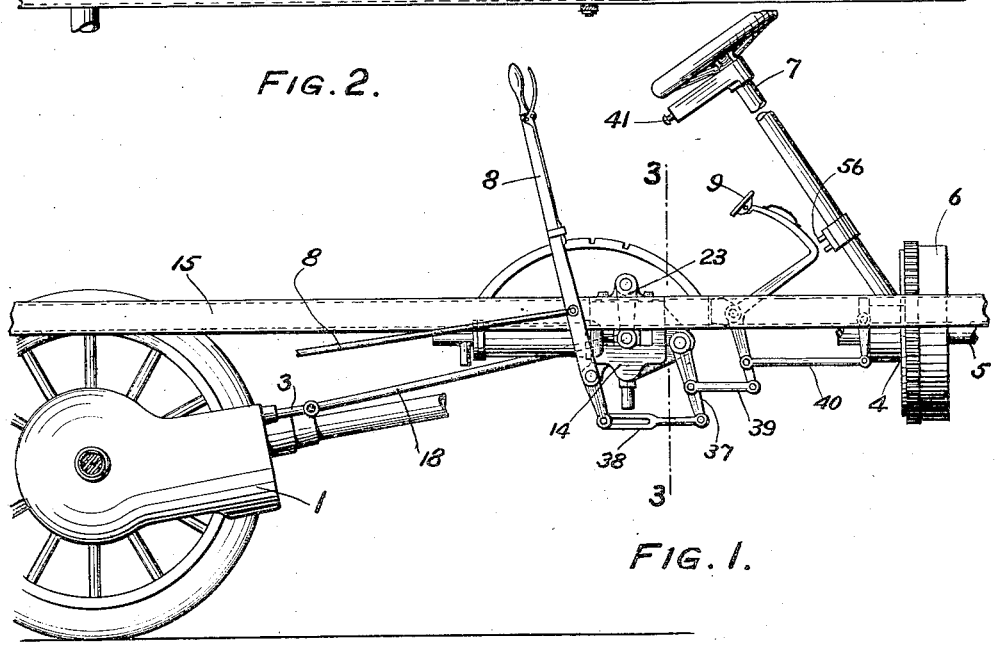
Figure 3:
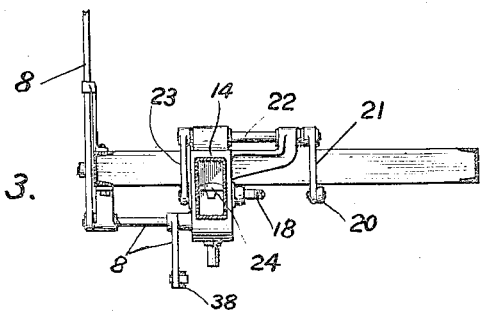
Figure 8:
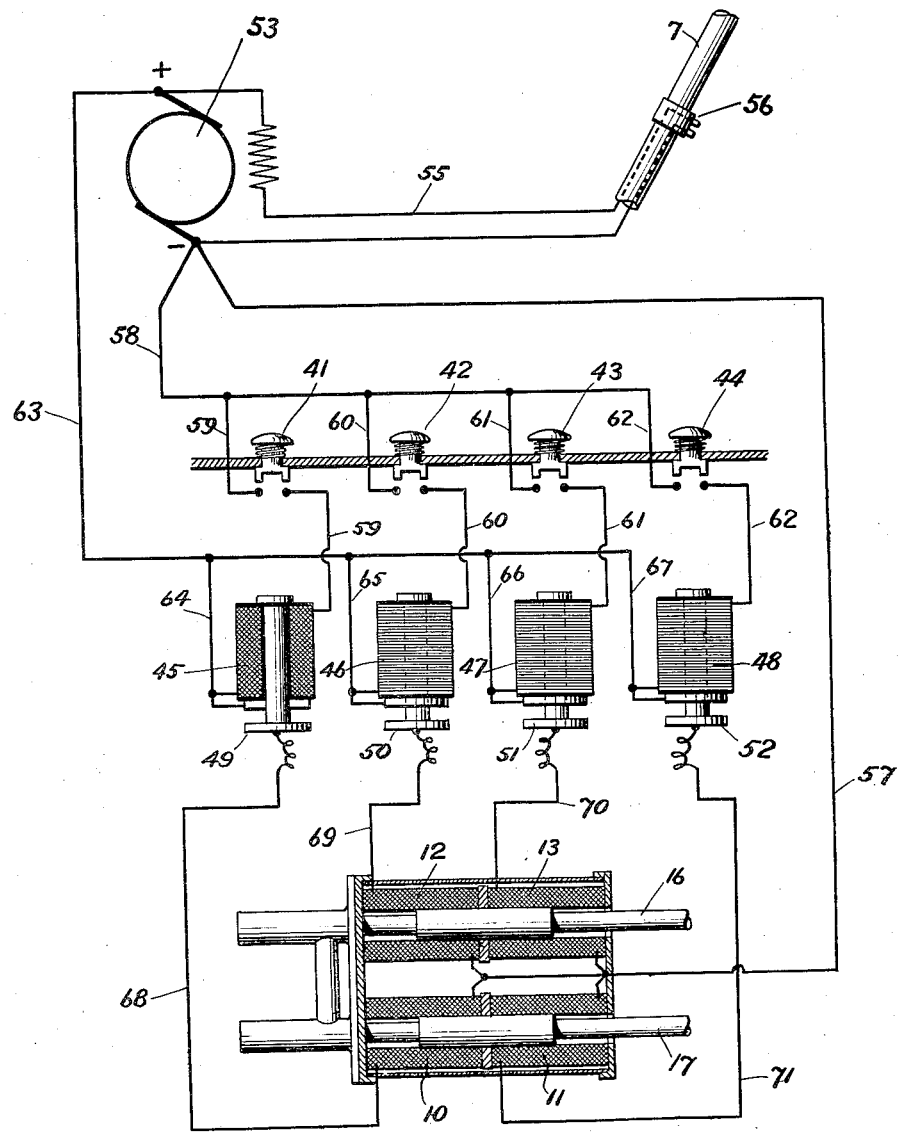

Figure 1, is a side view illustrating parts of an automobile and showing mechanism embodying features of the invention in application thereto. Fig. 2, is a top or plan view of the same. Fig. 3, is a sectional view taken on the line 3—3, Fig. 1, and looking from right to left. Fig. 4, is an elevational view, partly in section, drawn to an enlarged scale and illustrating mechanism embodying features of the invention. Fig. 5, is a top or plan view with some of the upper parts removed of the mechanism shown in Fig. 4. Fig. 6, is a sectional view on the line 6—6, of Fig. 4. Fig. 7, is a top or plan view, partly in section, of the mechanism shown in the lefthand end of Fig. 4, and Fig. 8, is a diagrammatic view of circuit connections that may be employed in connection with the invention.

For the sake of description the invention is illustrated in connection with well known parts of an automobile but the invention is not confined for this reason to such specific parts or in fact to any particular construction of automobile.

In the drawings 1, indicates the well known gear case within which are change gears that are shifted to change the speed and direction of motion. 2 and 3, are gear shifters or rods that serve, when moved, to change these gears and thus vary the speed and direction of motion. 4, is the clutch by means of which the driving shaft 5, is connected and disconnected to and from the engine. 6, is the fly wheel; 7, the steering head; 8, the emergency brake; and 9, the clutch lever. These parts are well understood and they are present in one form or another in all automobiles of what may be called the gasolene type, so that I do not claim them herein nor do I limit myself to any specific type of them and I refer to them so that my invention will be understood.

To some convenient portion of the frame of the machine and in some convenient location are arranged two pairs of magnets 10 and 11, and 12 and 13. As shown these are arranged in a housing 14, secured to the frame 15, but this arrangement is illustrative. For each pair of magnets there is a core bar 16 and 17. The core bars move endwise and they are connected with the gear shifters. In the present instance the gear shifter 3, is connected by a link 18, to the core bar 16, or to a block connected thereto or carried thereby and arranged to slide in ways 19, in the housing 14. The shifter bar 2, is connected by a link 20, to one arm 21, of a rockshaft 22, the other arm 23, of which is connected with a block 19ª, working in ways in the housing 14, and carried by or connected with the core rod 17. This particular arrangement of rockshaft is used rather than a direct connection merely to accommodate the arrangement to the type of automobile chosen for illustration. There is a cam yoke 24, movable transversely of the direction of motion of the core rods. This yoke 24, is shown as guided by rods 25, of which four are shown in the drawings, and these rods are connected with the housing 14. The cam face 26, of the yoke 24, is shown of the form of a triangle with one of its angles centrally disposed and this angle is shown as provided with a roller seat.

There are rollers 27, connected with the core rods and these rollers coöperate with the cam faces 26, of which there are two, one for each roller. As shown the studs that connect the blocks 19 and 19ª, with the parts 18 and 23, move in slots in the housing 14. When the cam block 24, is lifted, the cams 26, acting on the rollers 27, shift the core rods into their intermediate positions and these positions correspond to the positions of the shifters 2 and 3, which bring the gears into neutral position which is well understood. When the yoke 24, is in its low position the core rods 16 and 17, may be freely shifted endwise and when so shifted they move the shifters 2 and 3, and thus accomplish speed changes and reverse, as is well understood. The electro-magnets serve, when one or the other of them is energized, to shift the core rods, but it is desirable that only one of these bars or rods should be free to be shifted at the same time. Otherwise damage might be done the gears as is well understood. Projecting from the housing 14, are shells 28 and 29, in which the ends of the core bars 17 and 16, work.

Within a casing 30, are arranged a pair of bolts having a spring interposed between them, and the combined length of these bolts is such that when they are in contact at their inner ends, one of their outer ends rests upon the surface of one of the core rods 16 and 17, and the other of their outer ends occupies a notch in the other core rod. The notches 31, in the core rods are engaged by both bolts in the casing 30, when the core bars or rods are in neutral position, that is, in position corresponding to the neutral position of the gears. As soon as one of the bars or rods is moved, it forces the bolt out of its notch and this causes the bolt so forced to bear upon the surface of this rod and upon the end of the other bolt which is thus held in the notch of the other bar and prevents the latter from moving.

32, are spring detents which coöperate in notches of the bars 16 and 17, and thus, when the latter are in their extreme positions, hold them against accidental movement. There is a spring 33, which tends to bring the cam yoke or block 24, into its depressed position.

34, is a trigger arm carrying at its end a trigger 35, shown as pivoted to it like a knife blade so as to be capable of turning up independently of the arm but not down.

36, is a spring that operates on the trigger. When the arm 34, is turned clockwise in the drawings the yoke or cam block 24, is lifted because the trigger 35, engages it, as shown in the drawings the central part of it. As the lifting motion continues, the trigger 35, passes clear of the block which then falls or is brought down by its spring 33. Counter-clockwise movement of the arm 34, causes the trigger to turn upward, pass by the block 24, and then resume its original position under the block. The shaft that carries the arm 34, is connected with the clutch 4, or the movable member thereof, and with the emergency brake 8. As shown this shaft is provided with an arm 37, that is connected by means of a slotted link 38, with the brake lever 8, and that is connected with the clutch lever 9, by a link 39. The clutch lever 9, is connected with the clutch by means of a link 40. The slotted link 38, permits the arm 39, to be turned by the clutch lever 9, even when the brake lever 8, is at rest, and when the brake lever 8, is shifted, it shifts the arm 39, and the clutch.

The various electro-magnets are magnetized and de-magnetized by means of push buttons 41, 42, 43, 44, which are arranged on the steering head at or near the rim of the wheel although of course the invention is not limited to the particular location of the push buttons, still as the hands of the operator are on the wheel it is distinctly advantageous to have the push buttons near his hands. To break the current at the push buttons might give rise to sparking and arcing. To avoid this use is made of relays or circuit breaker coils 45, 46, 47 and 48, which are fitted with circuit breaking plates or circuit breakers 49, 50, 51 and 52. Generally speaking the coils of the circuit breakers and their push buttons constitute paths of high resistance and are in parallel relation with the coils of the electro-magnets and the circuit breaking plates 49, which constitute paths of low resistance, so that the current to be broken at the push buttons is considerably smaller than the current to be broken at the circuit breaker plates. The latter are constructed and located in such manner as to be capable of breaking these relatively high currents.

53, is a source of power or current. It is shown to consist of a dynamo machine suitably located and attached to the automobile or vehicle and driven from the engine thereof. As shown it is driven by a shaft 54, geared to the fly wheel 6, which is connected with the engine. However, the source of power 53, may be variously constructed and arranged.

When the clutch is in, it is undesirable to shift any of the gears. To prevent shifting the gears when the clutch is in, the clutch lever is made to open and close the field circuit 55, of the dynamo 53. At the contacts 56, the clutch lever 9, closes this field circuit 55, only when the lever is in such position that the clutch is out. When the clutch is in, contact is broken at 56. To one pole of the dynamo, say the negative pole, although the sign is not material, there is connected by a conductor 57, one end of each of the coils of the magnets 10, 11, 12 and 13. To this negative pole there are also connected the contacts of each of the push buttons. In the diagram of Fig. 8, this is accomplished by a conductor 58, having branches 59, 60, 61 and 62, which are connected to one end of the coils 45, 46, 47 and 48. The other ends of these coils are connected to the positive side of the source by means of a conductor 63, having branches 64, 65, 66 and 67. The ends of these branches also connect or are in connection with one of the circuit breaking plates of each of the coils. The other circuit breaking plates are connected by conductors 68, 69, 70 and 71, to the other ends of the coils of the magnets 10, 11, 12 and 13.

Assuming that the parts are in the positions shown in Fig. 4, and that the clutch is out and the engine and dynamo running, a description will be given of the manner in which gears are shifted. Assuming that the change of gears desired corresponds to the change effected by the push button 41, the latter is pushed. Thus the circuit by way of 58, 59, coil 45, conductor 64, and 63, is closed. At the same time the contact plate at 49, goes up and the circuit from 64, through contact 49, conductor 68, coil of magnet 10, and conductor 57, is closed. The magnet 10, is therefore energized and the core bar 17, is drawn toward the left in Fig. 4, thus accomplishing two results. In the first place it locks the core bar 16, by the bolts at 30, Fig. 7, and in the second place, it operates the parts 23, 22, 21, and shifter 20. If it should be desired to shift the shifter 20, in the other direction, the push button 44, is closed establishing a circuit by 58, 62, coil 48, 67 to 63. At the same time a circuit is closed from 67, through the contacts at 52, by 71, through 11, to 57. This energizes the magnet 11, which pulls the core bar 17, and the parts connected with it, including the shifter 20, in the other direction. It is not the intention that two buttons be pushed at once, but no injury happens if this is done. For example, if the buttons 41 and 44, be pushed at the same time, the magnets 10 and 11, simply oppose each other, and if the buttons 42 and 43, be pushed singly or together nothing happens because the core bar 16, is locked by the bolt at 30.

If the desired change in gear shifters is to be effected by the shifter 18, then the circuits would be made by the push buttons 42 or 43. When the push button 42, is closed, the circuit is from 58, by 60, through the coil 46, and by 65 to 63. The circuit is also from 63, through the contact 50, by 69, through the coil 12, to 57. This moves the core bar 16, toward the left and the core bar moves the gear shifter 18, toward the left. When this is being done the core bar 17, is locked by the bolts at 30. When the push button 43, is closed, the circuit is from 58, by 61, through coil 47, by 66, to 63, and from 66, through contact 51, conductor 70, coil 13, and conductor 57. This magnetizes the coil 13, and draws the core bar 16, and with it the shifter 18, toward the right. It will be understood that before each gear shift the gears are brought to neutral position and the clutch thrown out and held out while the gears are shifted so that the operation is to first throw the clutch out. This establishes the field circuit 55, at 56, and also lifts the cam yoke 24, and then drops it or permits it to come down under the influence of its spring 33, under the trigger arm 34. The effect of this motion of the cam yoke is to bring the core bars into the position shown in Fig. 5, which corresponds with neutral position of the speed gears and to leave the core bars free to be operated in the manner described by the electro-magnets while the clutch is still out, and if the clutch is not kept out the field circuit will not be made and the gears cannot be shifted. After the gears have been shifted, the clutch can be thrown in, thus breaking the circuit and preventing the shifting of gears until the clutch is again thrown out. It is the trigger 35, that yields and gets under the yoke 24, when the clutch is thrown in, so that the trigger is in position for the next operation.

What I claim is:

1. Speed gear change mechanism for automobiles comprising the combination of speed gear shifters, electro-magnetic devices for operating the shifters, a source of current, push buttons, electro-magnetic circuit closers, and circuits including a push button and a coil of a circuit closer in branches of relatively high resistance and a coil of an electro-magnet and the contacts of a circuit closer in branches of relatively low resistance, substantially as described.

2. Speed gear change mechanism for automobiles comprising speed gear shifters, circuits including a source of current and having paths of relatively large and relatively small currents, electro-magnetic devices included in the paths of large current and adapted to operate the shifters, push buttons in the paths of relatively small currents, and relay devices controlled by the push buttons and operating to make and break circuit through the electro-magnetic devices, substantially as described.

3. Speed gear change mechanism for automobiles comprising speed gear shifters, electro-mechanical devices including a dynamo machine and circuits, and clutch mechanism provided with means for making and breaking the field circuits of the dynamo machine, substantially as described.

4. Speed gear change mechanism for automobiles comprising speed gear shifters, electro-magnetic devices including circuits and push buttons for operating the shifters, a dynamo electric machine, clutch actuating mechanism, and a field circuit for the dynamo machine which is opened and closed by the clutch mechanism, substantially as described.

5. In speed gear change mechanism for automobiles the combination of an electro-magnet coil, a speed gear shifting core bar adapted to be moved by said electro-magnet coil, a cam yoke provided with a cam adapted to position said bar, clutch mechanism, and an arm connected with the clutch mechanism and adapted to shift said yoke, substantially as described.

6. In speed gear change mechanism for automobiles the combination of an electro-magnet coil, a speed gear shifting core bar adapted to be moved by said electro-magnet coil, a cam yoke afforded motion transversely of the direction of motion of the bar and provided with a cam face for shifting the bar, clutch mechanism, and an arm connected with the clutch mechanism and provided with a trigger adapted to shift the yoke in one direction and pass it in the other direction, substantially as described.

7. In speed gear change mechanism for automobiles the combination of opposed electro-magnetic coils arranged in pairs, two notched speed gear shifting core bars of which one appertains to each pair of coils, a pair of relatively movable bolts the combined length of which is equal to the distance between the bottom of a notch in one bar and the surface of the other bar whereby either but not both bars can be shifted at one time, a movable element provided with cams for positioning both bars, and clutch mechanism provided with means for shifting said element, substantially as described.

8. Speed gear change mechanism for automobiles comprising a steering head, speed gear shifters, electro-mechanical devices for operating the shifters and circuits including a source of current and push buttons arranged on the steering head for controlling the electro-mechanical devices, substantially as described.

9. Speed gear change mechanism for automobiles comprising gear shifting core bars, clutch mechanism, mechanism interposed between said mechanism and core bars for putting the latter in neutral position when the clutch is out, and circuit connections including a source of power and push buttons and coils for shifting said bars into other positions, substantially as described.

10. Speed gear change mechanism for automobiles comprising speed gear shifters, clutch mechanism, connections between said mechanism and the shifters for putting the latter in neutral position when the clutch is thrown out, power devices for putting the shifters in other positions, and manually operated means for controlling the power devices, substantially as described.

11. Speed gear change mechanism for automobiles comprising clutch mechanism including an emergency brake and a clutch lever, push buttons, gear shifters, connections between the clutch mechanism and shifters whereby they are brought to neutral position when the clutch is out, and connections between the push buttons and shifters whereby they are moved, substantially as described.

12. Speed gear change mechanism for automobiles comprising gear shifters, means for operating the gear shifters including push buttons, and clutch mechanism provided with means for making the push buttons inoperative when the clutch is in and for positioning the shifters in neutral position as the clutch is thrown out, substantially as described.

In testimony whereof I have hereunto signed my name.

FRANK BEEMER.

Witnesses:
  FRANK E. FRENCH,
  K. M. GILLIGAN.